Oct. 9, 1934. J. W. BRIDGE 1,976,159
INCUBATOR FOR HATCHING OR INCUBATING EGGS
Filed June 15, 1931 2 Sheets-Sheet 2
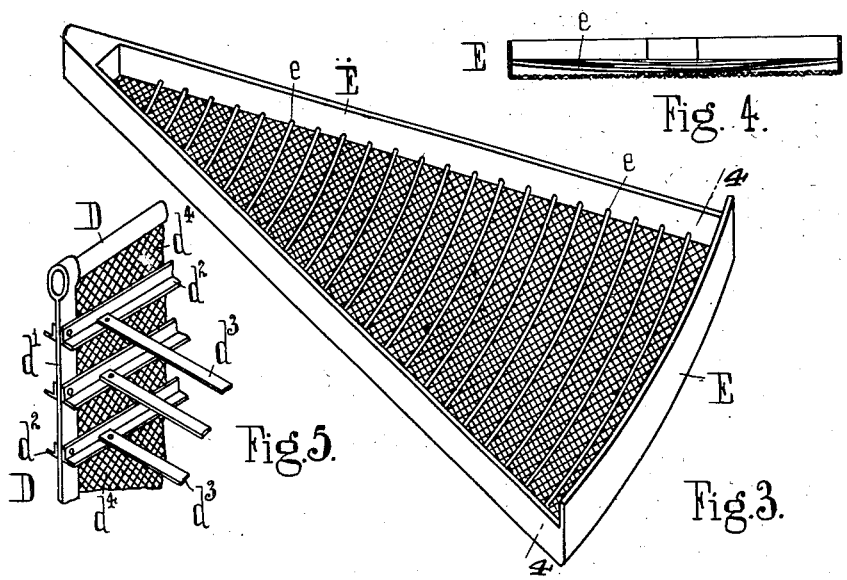
INVENTOR.
J. W. Bridge Patented Oct. 9, 1934

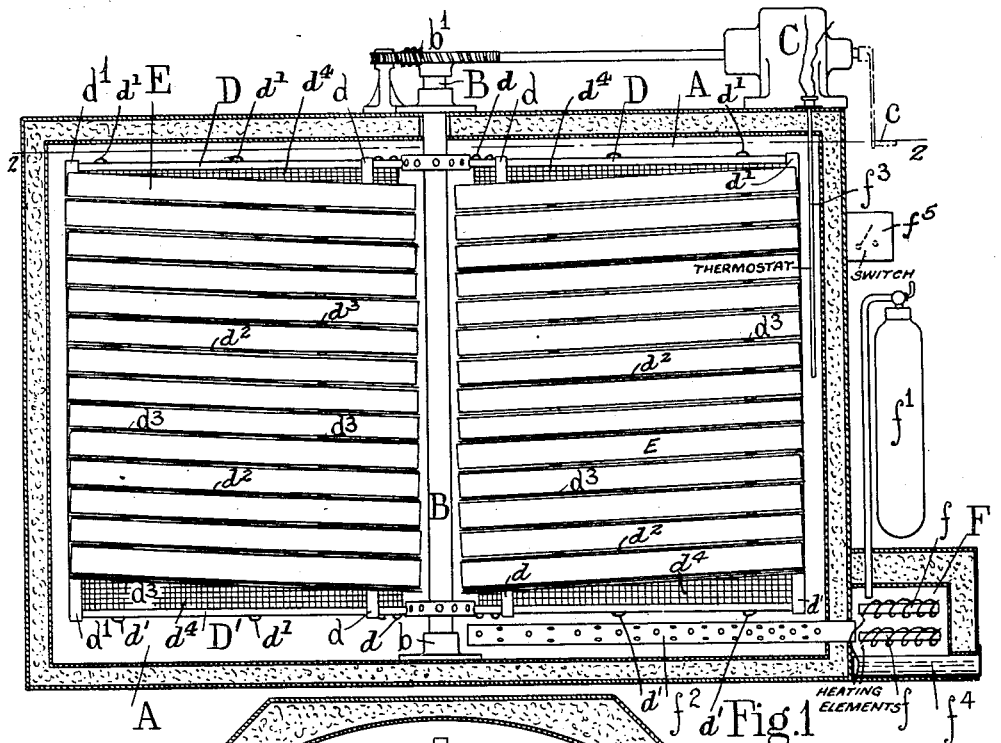
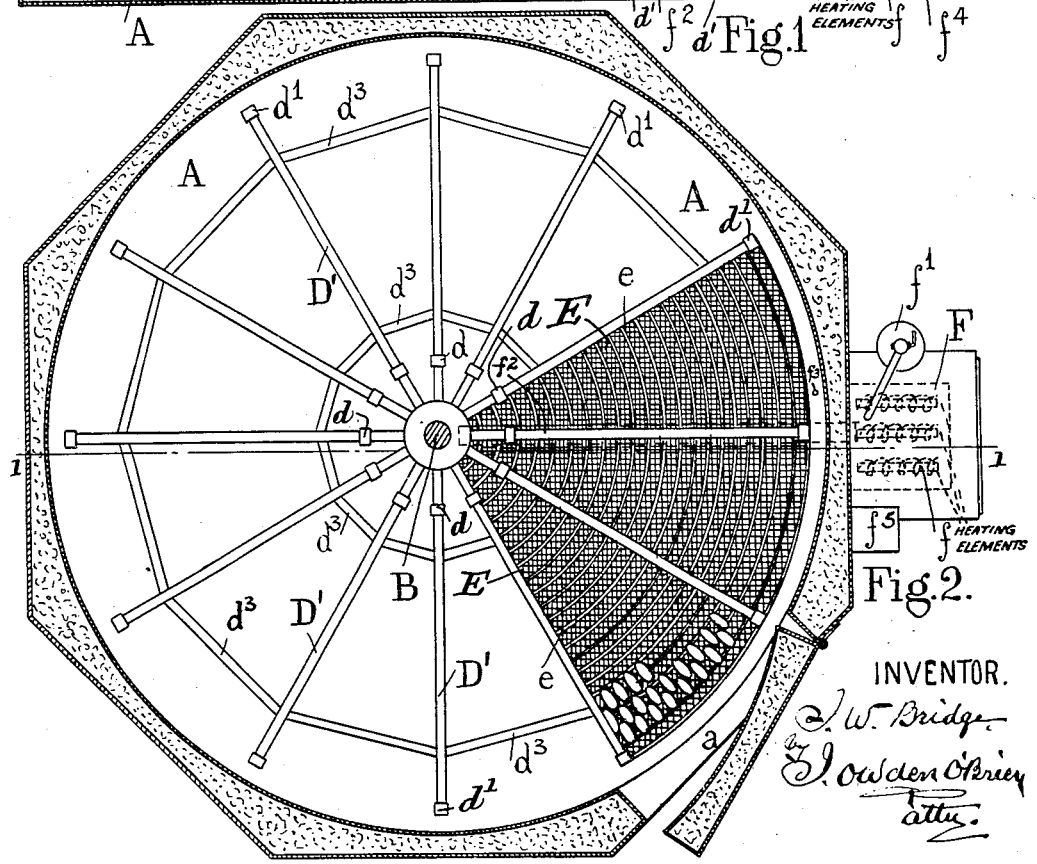

1,976,159

UNITED STATES PATENT OFFICE 1,976,159

INCUBATOR FOR HATCHING OR INCUBATING EGGS

John Whittam Bridge, Rochdale, England

Application June 15, 1931, Serial No. 544,536
In Great Britain September 29, 1930

1 Claim. (Cl. 119—44)

This invention relates to improvements in incubators for hatching or incubating eggs in which the eggs are carried on approximately horizontal trays or platforms which are given a rotary movement about a vertical axis so that the eggs are carried through the air with the object of neutralizing the effect of any differences in temperature there may be in different parts of the incubator.

According to the invention the eggs are carried in open mesh trays each of the shape of a sector of a circle arranged on supports radiating from a central shaft so that all parts of the eggs will have access to the air.

A further feature of the invention consists in arranging the rows of eggs in the trays with a small space between the eggs in each row so that they roll in relation to the tray when the direction of rotation of the trays is reversed or so that all the eggs in one tray can be rolled over at a single operation.

The invention will be described with reference to the accompanying drawings which illustrate an incubator for carrying out the invention.

Fig. 1 is a vertical section through the incubator on line 1—1 of Fig. 2.

Fig. 2 is a transverse section of same on line 2—2 of Fig. 1.

Fig. 3 is a perspective view of one of the egg carrying trays.

Fig. 4 is a transverse section on line 4—4 Fig. 3.

Fig. 5 is a perspective view showing in detail means for supporting the trays.

The incubator is constructed as a double walled chamber A of octagonal or other shape, the space between the two walls being filled with suitable heat insulating material. A centrally disposed vertical tube or shaft B is carried in a footstep bearing $b$ at the bottom of the chamber. The tube or shaft B projects through the top of the chamber and is rotated from a motor C or other driving means by the worm gear $b^1$.

A frame or spider D is affixed on the tube or shaft B at the top and a second frame or spider $D^1$ at the bottom thereof so that they will rotate therewith and this frame carries a series of vertical bars $d$ $d^1$ which are connected together in pairs by angle bars $d^2$ radiating from the axis of the shaft B and which serve as supports for the sector shaped trays E on which the eggs are placed. Transverse bars $d^3$ connect each pair of angle bars $d^2$ to prevent the trays E from falling when they are being withdrawn from the chamber A. The trays E are preferably inclined slightly upwardly from the centre towards the periphery to counteract the effect of centrifugal force.

Each tray E is formed with a wire mesh bottom above which is arranged a series of wires $e$ spaced apart at such a distance that the wires support the eggs. Each of the wires $e$ lies on a cylindrical surface coaxial with the cylindrical periphery of the tray i. e. having an axis coincident with that of the shaft B. The wires $e$ have also a component of curvature in a vertical plane as shown in Fig 4 the radius of curvature in the vertical plane of each succeeding wire increasing progressively as the wires approach the centre, the wire or wires adjacent to the centre being horizontal.

The peripheral speed of the wires adjacent to the centre is less than that of those further away therefrom and accordingly an increase in the radius of curvature or a diminution in the convexity of the wires as they approach the centre is provided to prevent the eggs from rolling violently against the sides and each other as the trays rotate.

The eggs are placed on the wire $e$ with a small space in each row so that when the trays are rotated the eggs will roll gently towards the rear edge of the tray and when the direction of rotation of the shaft B is reversed they will roll towards the opposite edge a distance equal to the total of the spaces originally left between the eggs.

Thus at each reversal of the direction of rotation the eggs will roll over without the necessity of moving them by hand which in the case of a large incubator containing many thousands of eggs is a long and tedious operation.

The motor B may be automatically controlled to reverse the direction of rotation of the trays at predetermined intervals.

The sides $e^1$ of the trays E may be solid as shown in Fig. 3 and extend upwards to a height sufficient to prevent the young chicks from falling out and vertical mesh division walls $d^4$ may separate one tier of trays from the next.

The trays E are inserted into and withdrawn from the chamber A through a door $a$ the trays being rotated to a position opposite the door by handle $c$ on the driving shaft or by the motor.

The chamber A is heated by electric heating elements $f$ arranged above a water trough $f^4$ in a chamber F communicating with the chamber A the elements being controlled preferably by the thermostat $f^3$. A switch $f^5$ may be provided for operating the heating elements.

Oxygen may be supplied from a cylinder $f^1$ to the chamber F, where it is heated and passes through a perforated tube $f^2$ into the chamber A as it is known that a supply of warm moist oxygen is beneficial to the chicks when breaking their way out of the shell in incubators since they are exhausted and an atmosphere having a high oxygen content helps them to recover more rapidly.

What I claim as my invention and desire to protect by Letters Patent is:—

An incubator comprising a closed chamber, a vertical shaft within the chamber, a motor to rotate the shaft, a plurality of tiers of arms sloping upward and outward from the shaft, open mesh bottomed, sector shaped trays carried by the arms, a plurality of spaced wires extending between the sides of the trays, the wires being convex downwardly with the convexity diminishing progressively as the wires approach the shaft to prevent centrifugal force from crushing the eggs when rotation of the shaft is stopped, a space being left in each row to allow the said eggs to turn on their axes on the reversal of the direction of rotation of the shaft, and open mesh vertical walls between adjacent tiers of trays.

JOHN WHITTAM BRIDGE.